May 9, 1933.  T. F. BRACKETT  1,907,490
FRICTION BRAKE
Filed Oct. 22, 1928
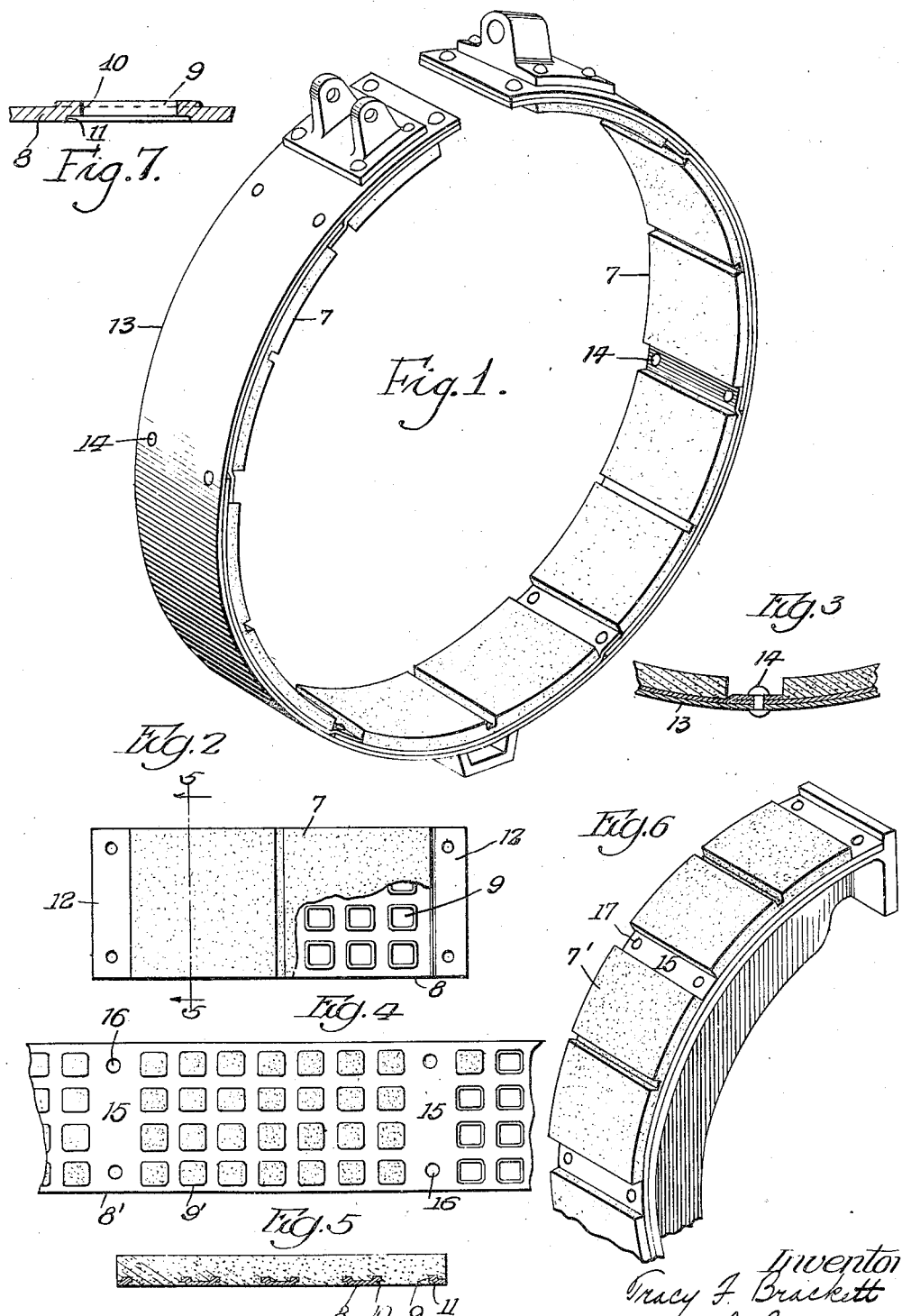
Inventor
Tracy F. Brackett
By Wm. O. Belt Atty Patented May 9, 1933

1,907,490

UNITED STATES PATENT OFFICE

TRACY F. BRACKETT, OF NEW YORK, N. Y., ASSIGNOR TO AMERICAN BRAKEBLOK CORPORATION, OF NEW YORK, N. Y., A CORPORATION OF NEW YORK

FRICTION BRAKE

Application filed October 22, 1928. Serial No. 314,069.

This invention relates to friction brakes and more particularly to friction blocks having a composition body mounted on a metal back and adapted for use on brake bands, shoes, or heads, or other supports in friction brakes of different varieties.

The primary object of the invention is to provide a secure anchorage between the body and the back of the block to prevent the body from being sheared or otherwise separated from the back under the conditions of use.

And a further object of the invention is to provide the metal back with openings to receive the body material and having the edges of the openings formed in a novel manner to make a secure anchoring engagement with the body.

In the accompanying drawing I have shown a selected embodiment of the invention and referring thereto:

Fig. 1 is a perspective view of a brake band with my invention applied thereto.

Fig. 2 is a plan view of a block with a portion of the body removed.

Fig. 3 is a detail sectional view.

Fig. 4 is a plan view of the back of a block made in the form of a strip.

Fig. 5 is a sectional view on the line 5—5 of Fig. 2.

Fig. 6 is a perspective view of a shoe or head support with my invention applied thereto in the form of a block strip.

Fig. 7 is a detail enlarged sectional view of a portion of the metal back.

Referring to the drawing, the block made as a separate unit comprises a body 7 preferably made of a suitable composition which will give desired braking effect and also possess long wearing quality, and it is mounted on a metal back 8 which is provided with openings 9 to receive the body material for anchoring the body to the back. I prefer to make the openings 9 rectangular in form with opposite edges thereof transverse to the length of the block. The openings are formed by stamping and at the same time the edge 10 of each opening is depressed or offset from the outer face of the back. By depressing or offsetting the edge a peripheral recess is formed about the opening and the body material is received in the opening and in the recess whereby it is spread on the outer face of the back beyond the edge of the opening and abutting the shoulder 11 bounding the recess to make an anchoring engagement with the back, as more clearly shown in Fig. 5.

The body material may be molded or otherwise formed on the back and the offset edge of each opening will be wholly embedded in the body material which not only fills each opening but also engages the outer as well as the inner side of the edge of each opening and is anchored to the back. This construction provides an effective anchorage of the body to the metal back, especially for relatively thin brake blocks for lighter work. When the block is made as a complete unit (Fig. 2) the ends 12 of the back may extend beyond the ends of the body so that they can be overlapped and secured together and to a brake band 13 (Fig. 3) by rivets 14 or other suitable fastening means. Or the blocks may be made in strip form, Figs. 4 and 6, the metal back 8' being continuous and provided with openings 9' arranged in series, each series being spaced from the next to leave a blank space 15 having openings 16 for the fastening devices.

The back strip may be made continuous in any convenient length. The body 7' is mounted on the back strip over the series of openings 9', and the bodies are spaced apart on the back so that the fastening devices 17 may be easily engaged with the openings 16 in the support.

The invention provides a simple manner of anchoring the body on the back securely to withstand the shearing and other strains to which the body is subjected under braking and other service conditions. I have shown and described the openings 9 and 9' as rectangular because I consider this a desirable shape for the openings since it provides for a substantial area of body material in the opening to anchor the body to the back.

In the use of a brake block of this general type the moving part to be braked tends to tear or pull away from the back with a shearing action and hence the necessity for a secure anchorage of the block to the back. The pull of the moving part on the body of the brake block may be in either direction of the length of the block and the rectangular openings provide a large amount of body material in the openings with this body material disposed in a manner best suited for resisting the strains of service. It will be noted in Fig. 4 that the openings are disposed in parallel rows extending lengthwise and transversely of the back and the transverse sides of the body portions in the openings present substantial resistance to any strains tending to pull the body lengthwise relative to the back in either direction.

I have described the invention in forms which I consider desirable for the purposes intended, but I reserve the right to make any changes therein that fall within the scope of the following claims.

I claim:

1. A friction block comprising a composition body and a metal back therefor, said back having a plurality of openings to receive the body material for anchoring the body to the back, the edges of said openings being set-off inwardly of the back and embedded within the body.

2. A friction block comprising a composition body and a metal back therefor, said back having a plurality of openings to receive the body material for anchoring the body to the back, edges of said openings being set-off inwardly of the back and extending substantially parallel with the body of the back and embedded in the body, the body material in said openings overlapping said set-off edges and lying substantially flush with the outer face of the back between said depressed edges.

3. A friction block comprising a composition body and a metal back therefor, said back having a plurality of openings, the edges of each opening being set-off inwardly to form a peripheral recess about said opening, and a shoulder about the recess on the outer side of the back extending substantially at a right angle to the body of the back, the material of the body filling said openings and said recesses and abutting said shoulders.

4. A friction block comprising a composition body and a metal back therefor, said back having a plurality of openings therein, the marginal edge of each of said openings being set-off inwardly and extending substantially parallel with the body of the back and forming a recess in the back extending over the outer side of said marginal edge, said offset edge forming a substantially right angular shoulder which defines the outer boundary of said recess, the body material filling said opening and recess and abutting said shoulder and lying substantially flush with the outer face of the back.

TRACY F. BRACKETT.